(12) United States Patent
Weddle

(10) Patent No.: US 6,199,769 B1
(45) Date of Patent: Mar. 13, 2001

(54) APPARATUS AND METHOD FOR OPERATING AN ADJUSTABLE-WIDTH AXLE ASSEMBLY OF A CROP SPRAYER

(75) Inventor: Kenneth E. Weddle, Trafalgar, IN (US)

(73) Assignee: Equipment Technologies, Inc., Mooresville, IN (US)

(*) Notice: Subject to any disclaimer, the term of this patent is extended or adjusted under 35 U.S.C. 154(b) by 0 days.

(21) Appl. No.: 09/496,360

(22) Filed: Feb. 2, 2000

(51) Int. Cl.⁷ .................. A01G 25/09; B05B 1/20
(52) U.S. Cl. .................. 239/172; 239/159; 180/906
(58) Field of Search .................. 239/159, 172; 180/906, 9.48; 301/128

(56) References Cited

U.S. PATENT DOCUMENTS

| | | | |
|---|---|---|---|
| 2,504,403 | 4/1950 | Finley | 180/906 |
| 2,535,762 * | 12/1950 | Tapp et al. | 180/906 |
| 2,695,179 | 11/1954 | Fancsali | 280/32.5 |
| 2,750,204 | 6/1956 | Ohrmann | 280/150 |
| 2,767,995 | 10/1956 | Stout | 280/34 |
| 3,000,673 | 9/1961 | Lansing | 301/128 |
| 3,033,301 | 5/1962 | Blue et al. | 180/26 |
| 3,136,379 | 6/1964 | Lauster | 180/62 |
| 3,203,202 | 8/1965 | Brownyer | 64/23 |
| 3,216,739 | 11/1965 | Drenter | 280/34 |
| 3,236,324 | 2/1966 | Levratto | 180/46 |
| 3,526,047 | 9/1970 | Roessler et al. | 280/6.11 |
| 3,532,307 | 10/1970 | Larson | 280/34 |
| 3,558,148 | 1/1971 | Johnson | 280/6.11 |
| 3,625,381 | 12/1971 | Menzi | 214/138 |
| 3,777,919 | 12/1973 | Konijn | 214/147 G |
| 3,782,491 | 1/1974 | Herbenar | 180/906 |
| 3,826,322 | 7/1974 | Williams | 180/1 AW |
| 3,899,037 | 8/1975 | Yuker | 280/6.11 |
| 3,980,316 | 9/1976 | Yates | 280/112 A |
| 4,109,747 | 8/1978 | Hornagold et al. | 180/140 |
| 4,350,222 * | 9/1982 | Lutteke et al. | 180/906 |
| 4,449,600 | 5/1984 | Telfer | 180/132 |
| 4,462,610 | 7/1984 | Saito et al. | 280/707 |
| 4,483,522 | 11/1984 | Dorscht | 280/690 |
| 4,606,551 | 8/1986 | Toti et al. | 280/707 |
| 4,803,830 * | 2/1989 | Junge et al. | 56/28 |
| 5,039,129 | 8/1991 | Balmer | 280/840 |
| 5,040,823 | 8/1991 | Lund | 280/772 |
| 5,121,808 | 6/1992 | Visentini et al. | 280/638 |
| 5,282,644 | 2/1994 | Larson | 280/638 |
| 5,419,577 * | 5/1995 | Murray | 280/656 |
| 5,464,243 | 11/1995 | Maiwald et al. | 180/906 |
| 5,489,113 | 2/1996 | Torborg | 280/638 |
| 5,566,970 | 10/1996 | Lin | 280/689 |
| 5,899,472 | 5/1999 | Burke et al. | 280/124.106 |
| 6,119,882 * | 9/2000 | Crook et al. | 180/906 |

* cited by examiner

Primary Examiner—Andres Kashnikow
Assistant Examiner—Davis Hwu
(74) Attorney, Agent, or Firm—Maginot, Addison & Moore (57) ABSTRACT

A crop sprayer includes a chassis and a differential assembly secured to the chassis. The crop sprayer also includes a hub assembly having a hub support plate with a wheel hub rotatably secured thereto. The crop sprayer further includes a first telescoping support assembly having a first outer tube and a first inner tube which is positioned within the first outer tube. The first inner tube is movable relative to the first outer tube. The crop sprayer moreover includes a second telescoping support assembly having a second outer tube and a second inner tube which is positioned within the second outer tube. The second inner tube is movable relative to the second outer tube. The crop sprayer yet further includes a telescoping drive shaft assembly. Both the first outer tube and the second outer tube are secured to the chassis. Both the first inner tube and the second inner tube are secured to the hub support plate. A first end of the telescoping drive shaft assembly is secured to an output of the differential assembly, whereas a second end of the telescoping drive shaft assembly is secured to the wheel hub. The telescoping drive shaft assembly is interposed between the first telescoping support assembly and the second telescoping support assembly. A method of operating an adjustable-width axle assembly of a work machine is also disclosed.

20 Claims, 10 Drawing Sheets

APPARATUS AND METHOD FOR OPERATING AN ADJUSTABLE-WIDTH AXLE ASSEMBLY OF A CROP SPRAYER

CROSS REFERENCE

Cross reference is made to copending U.S. patent applications Ser. No. 09/496,400, entitled "Apparatus and Method for Operating a Hydraulic Suspension System of a Crop Sprayer" by Kenneth E. Weddle; Ser. No. 09/496,401, entitled "Apparatus and Method for Locking an Adjustable Width Axle Assembly of a Crop Sprayer" by Kenneth E. Weddle; and Ser. No. 09/496,401, entitled "Apparatus and Method for Adjusting Height of a Chassis of a Crop Sprayer" by Kenneth E. Weddle, each of which is assigned to the same assignee as the present invention, and each of which is filed concurrently herewith.

TECHNICAL FIELD OF THE INVENTION

The present invention relates generally to a crop sprayer, and more particularly to an apparatus and method for operating an adjustable-width axle assembly of a crop sprayer.

BACKGROUND OF THE INVENTION

A self-propelled crop sprayer is a work machine which includes a storage tank for storing liquid chemical such as herbicides, pesticides, and fertilizers that are to be sprayed onto crops which are growing in a farm field. The liquid chemical within the storage tank is sprayed onto the crops growing in the field by use of a nozzle assembly secured to a number of booms as the crop sprayer is advanced along the rows of the field.

It is desirable for a crop sprayer to be utilized in conjunction with a number of varying field conditions. For example, the distance between rows of plants varies from field to field. Accordingly, it is desirable to provide a crop sprayer which is capable of adjusting the distance between its two right wheels and its two left wheels so as to allow the crop sprayer to be advanced down the rows associated with the field without damaging or destroying the crops planted therein. In order to accommodate this need, crop sprayers have heretofore been designed with adjustable-width axle assemblies. However, heretofore designed adjustable-width axle assemblies have a number of drawbacks associated therewith. For example, adjustable-width axle assemblies which have heretofore been designed are relatively mechanically complex and include a relatively large number of components thereby increasing the costs associated with manufacture and operation of the crop sprayer. Moreover, certain adjustable-width axle assemblies which have heretofore been designed are susceptible to mechanical failure thereby reducing the useful life of a number of the components associated with the crop sprayer.

It should be appreciated that it is often necessary to apply a number of different spray applications during the growth cycle of the crops in the field. For example, it may be necessary to apply a first spray application when the crops are relatively young, but then subsequent spray applications may be required after the crops have grown to a substantial height. It is desirable for the crop sprayer to be configured such that the frame or other components associated with the sprayer are positioned at a sufficient enough height above the field surface so as to clear the tops of the crops as the sprayer is advanced through the field.

It is therefore not uncommon for a farmer or farmer's cooperative to purchase two or more crop sprayers each of which has a different frame height for spraying crops of differing heights. However, this approach is relatively expensive and in some cases financially impossible for the farmer. In order to eliminate the need to purchase two or more different sprayers, a number of crop sprayers have been heretofore designed with adjustable-height mechanisms. However, such adjustable-height mechanisms which have heretofore been designed are generally mechanically complex and contain a number of expensive components such as a hydraulic lifters along with the associated fluid components thereby increasing the costs associated with manufacture and operation of the crop sprayer.

It should also be appreciated that the crop sprayer must also be configured to easily and efficiently traverse varying surface topography when being operated in the field. For example, due to the long boom arms which crop sprayers require in order to cover many rows of crops with a single pass, a small change in the angle at which the chassis of the crop sprayer is oriented results in a large height change at the end of the boom arm thereby reducing crop clearance of the lowered boom arm. Hence, crop damage may occur if the boom arms sway back and forth across a relatively large distance as the crop sprayer encounters varying surface topography or if the boom arms are significantly moved upwardly and downwardly as the crop sprayer executes a turn. Moreover, the environment in which the crop sprayer is operated, a farm field, is particularly prone to having varying surface topography. In particular, it is not uncommon for a farm field to include areas called "washouts" in which soil has been displaced to create gradually sloping low spots. Advancement of a crop sprayer over such washouts, as well as turning the crop sprayer in the field, has the potential to undesirably shift the center of gravity and disturb the stability of the crop sprayer.

Moreover, the chemical storage tank must placed on the crop sprayer in a position which allows the tank to clear the crops as the sprayer advances through the field. The presence of the storage tank in such an elevated position, along with the fact that the liquid chemicals in the storage tank cause the storage tank to be extremely heavy, causes the crop sprayer to have a higher center of gravity relative to other types of work machines or a road traveling vehicle.

Hence, in order to manage the forces encountered by crop sprayers during operation thereof, a number of suspension systems have heretofore been designed. For example, hydraulic suspension systems have heretofore been designed that utilize a number of hydraulic cylinders which are provided in an attempt to dampen forces encountered by the crop sprayer. However, as described above, a crop sprayer is particularly sensitive to forces acting upon it due to its relatively high center of gravity and such heretofore designed suspension systems have not been capable of adequately stabilizing a crop sprayer as it is advanced and maneuvered within a farm field.

What is needed therefore is a crop sprayer which overcomes one or more of the above-mentioned drawbacks. What is further needed is a crop sprayer having an adjustable-width axle assembly which can be quickly and easily utilized to change the operational width of the crop sprayer. What is also needed is a crop sprayer having an adjustable-height chassis which can be quickly and easily utilized to change the operational height of the crop sprayer. What is moreover needed is a suspension system for a crop sprayer which is capable of adequately stabilizing a crop sprayer as it is advanced and maneuvered within a farm field.

SUMMARY OF THE INVENTION

In accordance with a first embodiment of the present invention, there is provided an adjustable-width axle assembly of a work machine. The axle assembly includes a first telescoping support assembly and a second telescoping support assembly. The axle assembly also includes a telescoping drive shaft assembly. The telescoping drive shaft assembly is interposed between the first telescoping support assembly and the second telescoping support assembly.

In accordance with a second embodiment of the present invention, there is provided a method of adjusting width of an axle assembly of a work machine. The axle assembly includes (i) a first telescoping support assembly, (ii) a second telescoping support assembly, and (iii) a telescoping drive shaft assembly. The method includes the step of extending each of the first telescoping support assembly, the second telescoping support assembly, and the telescoping drive shaft assembly so as to position the axle assembly in a first position during a first period of time. The telescoping drive shaft assembly is interposed between the first telescoping support assembly and the second telescoping support assembly during the extending step. The method also includes the step of operating the work machine so as to perform a first work function during the first period of time. Moreover, the method includes the step of retracting each of the first telescoping support assembly, the second telescoping support assembly, and the telescoping drive shaft assembly so as to position the axle assembly in a second position during a second period of time. The telescoping drive shaft assembly is interposed between the first telescoping support assembly and the second telescoping support assembly during the retracting step.

In accordance with a third embodiment of the present invention, there is provided a crop sprayer. The crop sprayer includes a chassis and a differential assembly secured to the chassis. The crop sprayer also includes a hub assembly having a hub support plate with a wheel hub rotatably secured thereto. The crop sprayer further includes a first telescoping support assembly having a first outer tube and a first inner tube which is positioned within the first outer tube. The first inner tube is movable relative to the first outer tube. The crop sprayer moreover includes a second telescoping support assembly having a second outer tube and a second inner tube which is positioned within the second outer tube. The second inner tube is movable relative to the second outer tube. The crop sprayer yet further includes a telescoping drive shaft assembly. Both the first outer tube and the second outer tube are secured to the chassis. Both the first inner tube and the second inner tube are secured to the hub support plate. A first end of the telescoping drive shaft assembly is secured to an output of the differential assembly, whereas a second end of the telescoping drive shaft assembly is secured to the wheel hub. The telescoping drive shaft assembly is interposed between the first telescoping support assembly and the second telescoping support assembly.

It is therefore an object of the present invention to provide a new and useful crop sprayer.

It is also an object of the present invention to provide an improved crop sprayer.

It is further an object of the present invention to provide a new and useful method of operating a crop sprayer.

It is yet another object of the present invention to provide an improved method of operating a crop sprayer.

It is moreover an object of the present invention to provide a crop sprayer in which the operational width of the crop sprayer may be quickly and easily altered.

It is also an object of the present invention to provide a crop sprayer in which the operational height of the crop sprayer may be quickly and easily altered.

It is moreover an object of the present invention to provide a crop sprayer which is relatively stable as the crop sprayer is advanced and maneuvered within a farm field.

The above and other objects, features, and advantages of the present invention will become apparent from the follower description and the attached drawings.

DETAILED DESCRIPTION OF THE INVENTION

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 1:
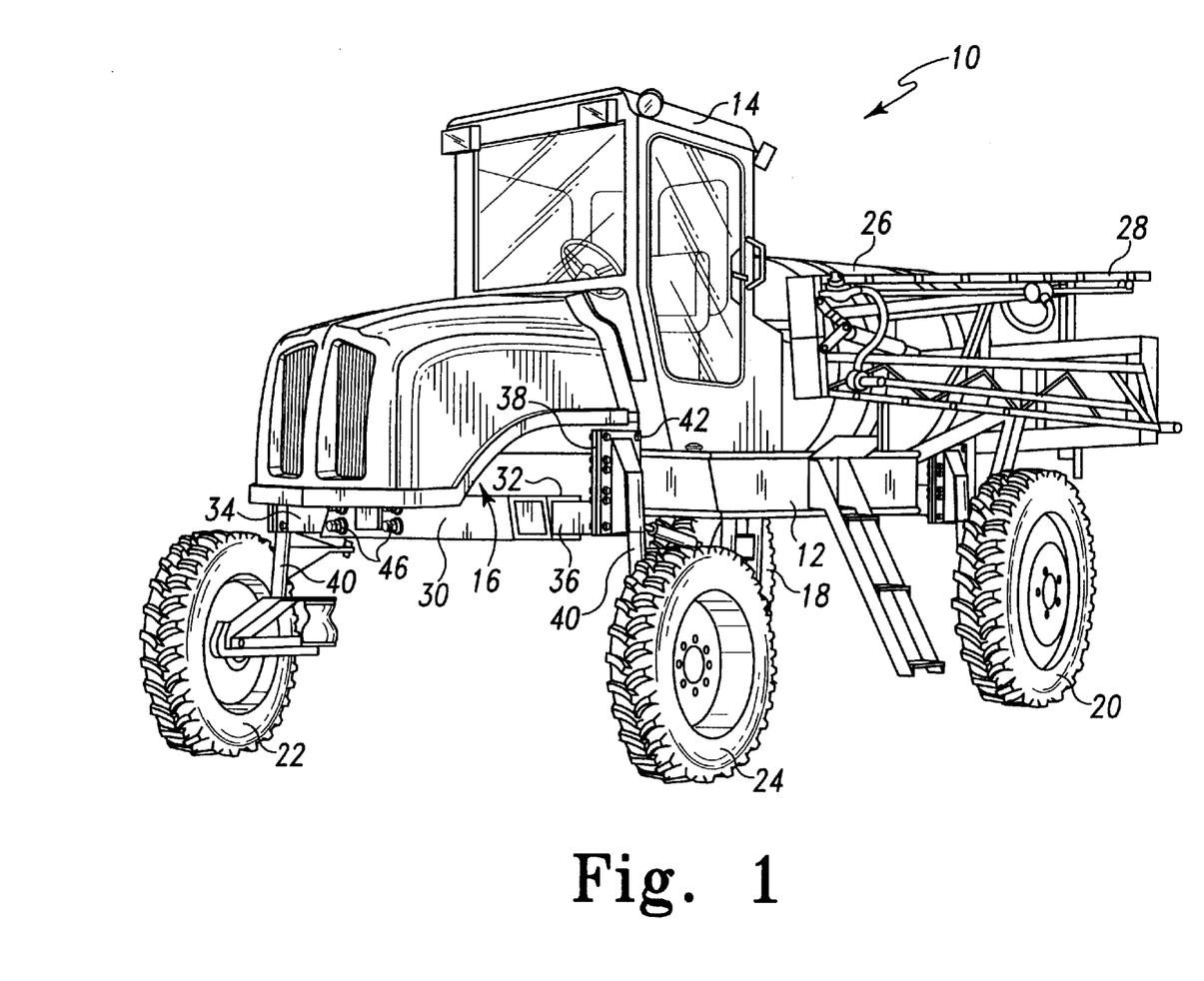
FIG. 1 is a perspective view of a crop sprayer which incorporates the features of the present invention therein.

Referring now to FIG. 1, there is shown a work machine such as a crop sprayer 10. The crop sprayer 10 includes a chassis 12 which is a support frame that spans most of the length of the crop sprayer 10 and provides a structure for mounting numerous components associated with the crop sprayer 10 thereon. For example, the crop sprayer 10 includes a cab 14 which is mounted on the chassis 12. The cab 14 houses an operator and a number of controls which are manipulated by the operator in order to control operation of the crop sprayer 10 during performance of a work function such as an agricultural spraying function.

The crop sprayer 10 also includes an engine 16 which is mounted on a forward portion of the chassis 12 in front of the cab 14. The engine 16 may be any type of internal combustion engine, but is preferably a diesel engine such as a Model 4BT diesel engine which is commercially available from Cummins Engine Company of Columbus, Ind.

The chassis 12 is supported by a pair of rear wheels 18, 20 and a pair of front wheels 22, 24. The engine 16 provides the motive power for driving the rear wheels 18, 20 thereby propelling the crop sprayer 10. In particular, in one exemplary embodiment, the crop sprayer 10 is configured with a hydrostatic drive system in which the engine 16 generates mechanical energy that is transferred to the rear wheels 18, 20 by a pair of hydraulic motors (not shown). However, as shall be discussed below in more detail, the crop sprayer 10 of the present invention may also be embodied with a mechanical drive system in which mechanical energy generated by the engine 16 is transferred to the rear wheels 18, 20 by a transmission (not shown), a drive shaft (not shown), a rear differential assembly, and a telescoping axle shaft assembly (see FIGS. 6–8). It should be appreciated that in either configuration (i.e. either equipped with a hydrostatic drive system or a mechanical drive system), the front wheels 22, 24 are operable to steer the crop sprayer 10.

The crop sprayer 10 further includes a storage tank 26 which stores diluted chemicals such as herbicides, pesticides, and fertilizers that are to be sprayed on a field. The storage tank 26 is mounted on the chassis 12 at a location which is aft of the cab 14. The crop sprayer 10 also includes a boom assembly 28 which is operable to distribute the chemicals over a wide area in a field. In particular, the diluted chemicals are distributed by a number of nozzles (not shown) which are spaced along the boom assembly 28 through which the diluted chemicals are sprayed as the crop sprayer 10 is propelled along the rows associated with the field.

Figure 2:
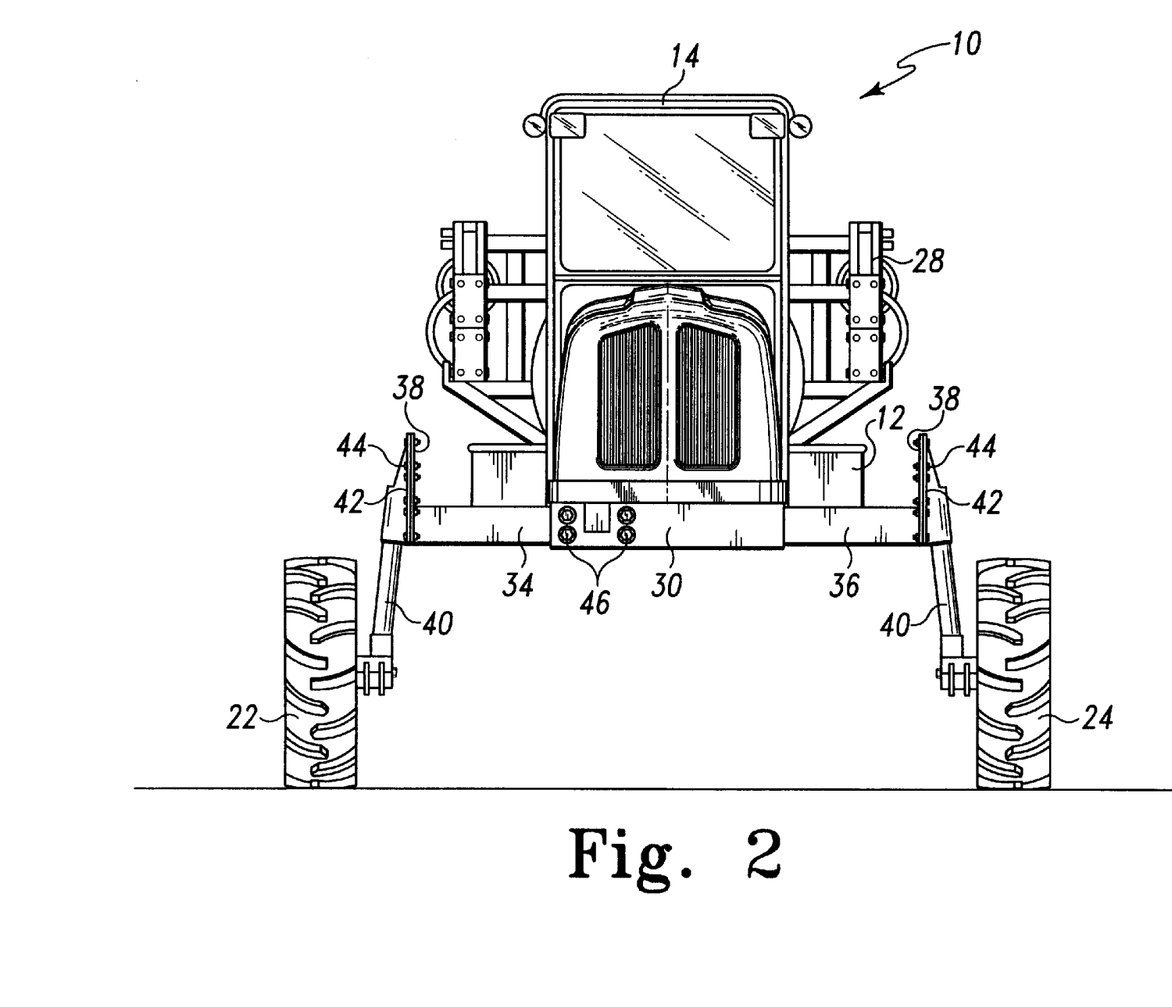
FIG. 2 is a front elevational view of the crop sprayer of FIG. 1 which shows the crop sprayer positioned in its lowered chassis position.
Figure 3:
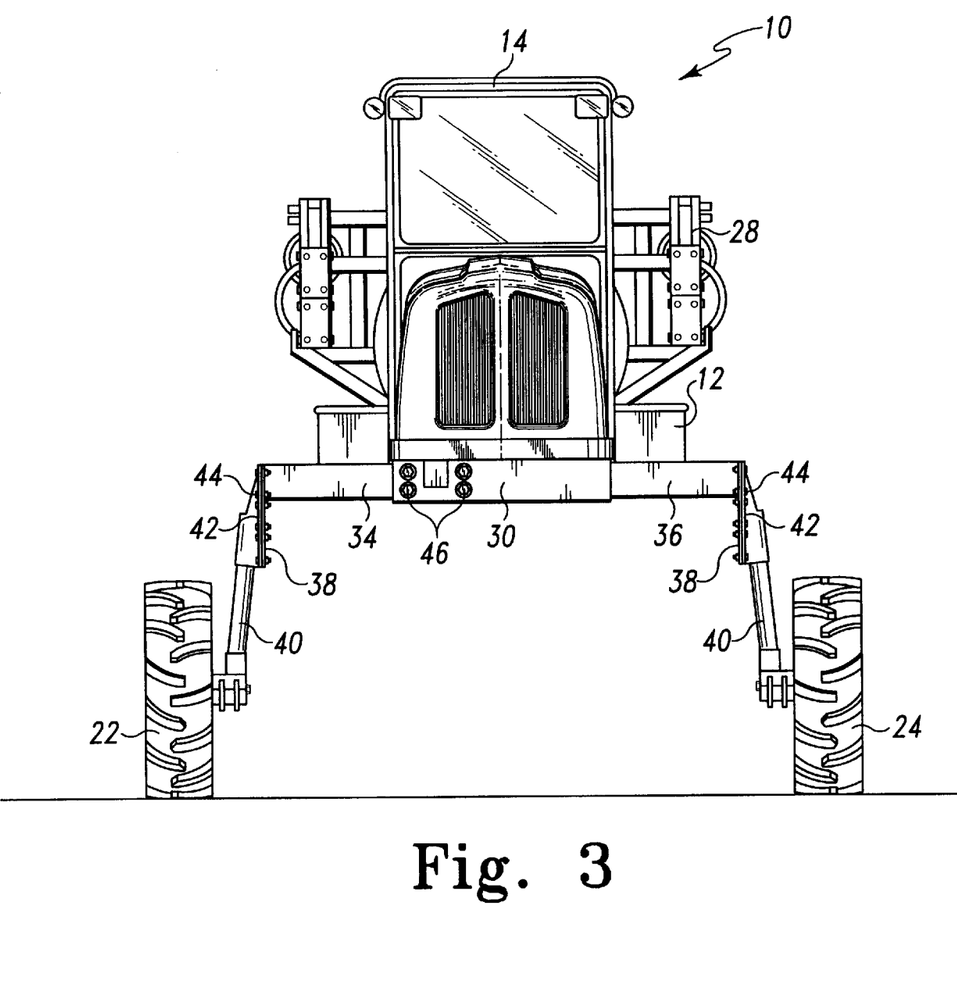
FIG. 3 is view similar to FIG. 2, but showing the crop sprayer positioned in its raised chassis position.

The crop sprayer 10 is configured to be operable at a number of different heights so as to allow the crop sprayer 10 to operate in fields with varying crop heights without contacting the crops as the crop sprayer 10 advances through the field. In particular, the chassis 12 of the crop sprayer 10 is positionable in either a lowered chassis position (as shown in FIG. 2) or a raised chassis position (as shown in FIG. 3) thereby allowing the operational height of the crop sprayer 10 to be altered based on the height of the crops in the field in which the crop sprayer 10 is to be operated. Such a feature is provided by use of removable support axles as shown in FIGS. 1–4. In particular, the chassis 12 has a support member such as an axle assembly having a number of outer axle tubes 30, 32 secured thereto (see FIGS. 1 and 4). In particular, a first end portion of each of the outer axle tubes 30, 32 is secured to the chassis 12, whereas a second end portion of the outer axle tubes 30, 32 has an opening defined therein. A respective first end of a pair of inner axle tubes 34, 36 is received into the opening defined in the second end portions of the outer axle tubes 30, 32. Each of the inner axle tubes 34, 36 has a mounting member such as a mounting plate 38 secured thereto. As shown in FIGS. 1–3, the mounting plate 38 has a first end which is secured to the inner axle tubes 34, 36 and a second end which extends therefrom.

A wheel strut 40 is secured to each of the mounting plates 38. In particular, each of the wheel struts 40 has a mounting plate 42 secured to an upper end thereof which is configured to mate with the mounting plates 38 secured to the ends of the inner axle tubes 34, 36. The wheels 18, 20, 22, 24 are rotatably coupled to a lower end of each of the wheel struts 40.

The inner axle tubes 34, 36 are positionable in either a lowered configuration or a raised configuration in order to position the mounting plates 38 in a corresponding orientation so as to lower or raise the chassis 12 of the crop sprayer 10. In particular, the inner axle tubes 34, 36 may be positioned in their lowered position so as to likewise position the mounting plates 38 in their lowered orientations as shown in FIG. 2. Thereafter, a number of fasteners such as bolts 44 may be utilized to secure the mounting plates 42 of the wheel struts 40 to the mounting plates 38. As shown in FIG. 2, such a mounting configuration positions the chassis 12 of the crop sprayer 10 in its lowered chassis position.

However, if it is desirable to position the chassis 12 of the crop sprayer 10 in its raised chassis position, the bolts 44 are first removed from the mounting plates 38, 42 so as to allow the wheel struts 40 to be detached from the inner axle tubes 34, 36. Thereafter, the inner axle tubes 34, 36 are removed from the outer axle tubes 30, 32 and rotated 180° to their respective raised positions and reinserted into the openings defined in the outer axle tubes 30, 32 as shown in FIG. 3. Once the inner axle tubes 34, 36 have been secured within the outer axle tubes 30, 32 in their respective raised positions (thereby positioning the mounting plates 38 in their respective raised orientations), the wheel struts 40 are re-secured to the inner axle tubes 34, 36. In particular, the bolt-receiving apertures defined in the mounting plates 38 are aligned with the bolt-receiving apertures defined in the mounting plates 42 and thereafter the bolts 44 are advanced therethrough so as to secure the mounting plates 38 to the mounting plates 42. As shown in FIG. 3, securing the mounting plates 42 to the mounting plates 38 of the inner axle tubes 34, 36 while the mounting plates 38 are positioned in their raised orientation causes the chassis 12 to be positioned in its raised chassis position thereby increasing the clearance of the crop sprayer 10.

As alluded to above, the manner in which the mounting plate 38 is secured to the inner axle tubes 34, 36 facilitates the above-described height-adjustment arrangement. In particular, by securing the mounting plate 38 to the inner axle tubes 34, 36 in an asymmetrical manner, rotation of the inner axle tubes 34, 36 causes vertical displacement of the mounting plate 38. For example, as shown in FIGS. 1 and 2, when the inner axle tubes 34, 36 are positioned in their respective lowered positions, the end of the mounting plates 38 that is secured to the inner axle tubes 34, 36 is positioned substantially below the other or distal end of the mounting plates 38. Conversely, when the inner axle tubes 34, 36 are positioned in their respective raised positions, the end of the mounting plates 38 that is secured to the inner axle tubes 34, 36 is positioned substantially above the distal end of the mounting plates 38.

Although the height-adjustment assembly of the crop sprayer 10 is described herein (and depicted in FIGS. 1–3) primarily in regard to the front axle assembly, it should be appreciated that the rear axle assembly of the crop sprayer 10 includes similar components (e.g. inner axle tubes 34, 36 and outer axle tubes 30, 32) and functions in substantially the same manner.

In order to allow the crop sprayer 10 to operate in fields which have differing crop row widths, the inner axle tubes 34, 36 may be slid relative to the outer axle tubes 30, 32. In particular, the inner axle tubes 34, 36 may be retracted inwardly toward the center of the chassis 12 in order to reduce the operational width of the crop sprayer 10. Conversely, the inner axle tubes 34, 36 may be extended outwardly away from the center of the chassis 12 in order to increase the operational width of the crop sprayer 10.

Figure 4:
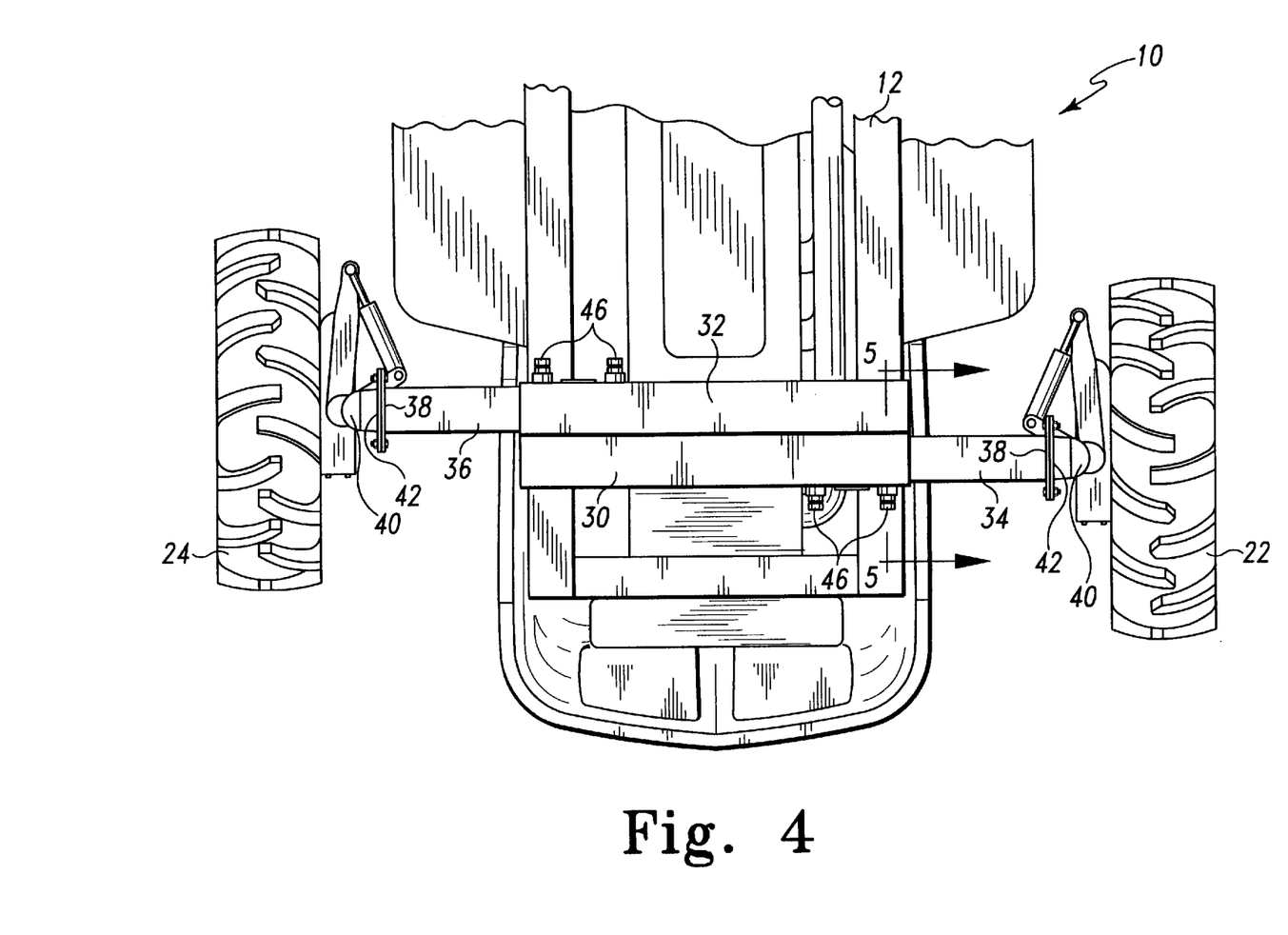
FIG. 4 is an enlarged bottom elevational view of a forward portion of the crop sprayer of FIG. 1.

As shown in FIG. 4, the outer axle tubes 30, 32 are offset relative to one another. What is meant herein by the term "offset" in regard to the orientation of the axle assemblies is that the two axle assemblies are not linearly aligned with one another. Such a configuration has numerous advantages. For example, by positioning the outer axle tubes 30, 32 in offset relation relative to one another, relatively long inner axle tubes 34, 36 may be utilized thereby increasing the maximum width to which the axle assembly may be extended. In particular, if the outer axle tubes 30, 32 were arranged in a linear fashion, the inner axle tubes 34, 36 could possess a maximum length equal to only one half of the length of the outer axle tubes 30, 32 since they would otherwise collide with one another when fully retracted into the outer axle tubes 30, 32. Such use of shorter inner axle tubes 34, 36 would undesirably reduce the maximum width to which the axle assemblies could be extended. However, by use of offset outer axle tubes 30, 32, relatively long inner axle tubes 34, 36 may be utilized since the inner axle tubes 34, 36 are not extended and retracted along the same linear path.

Figure 5:
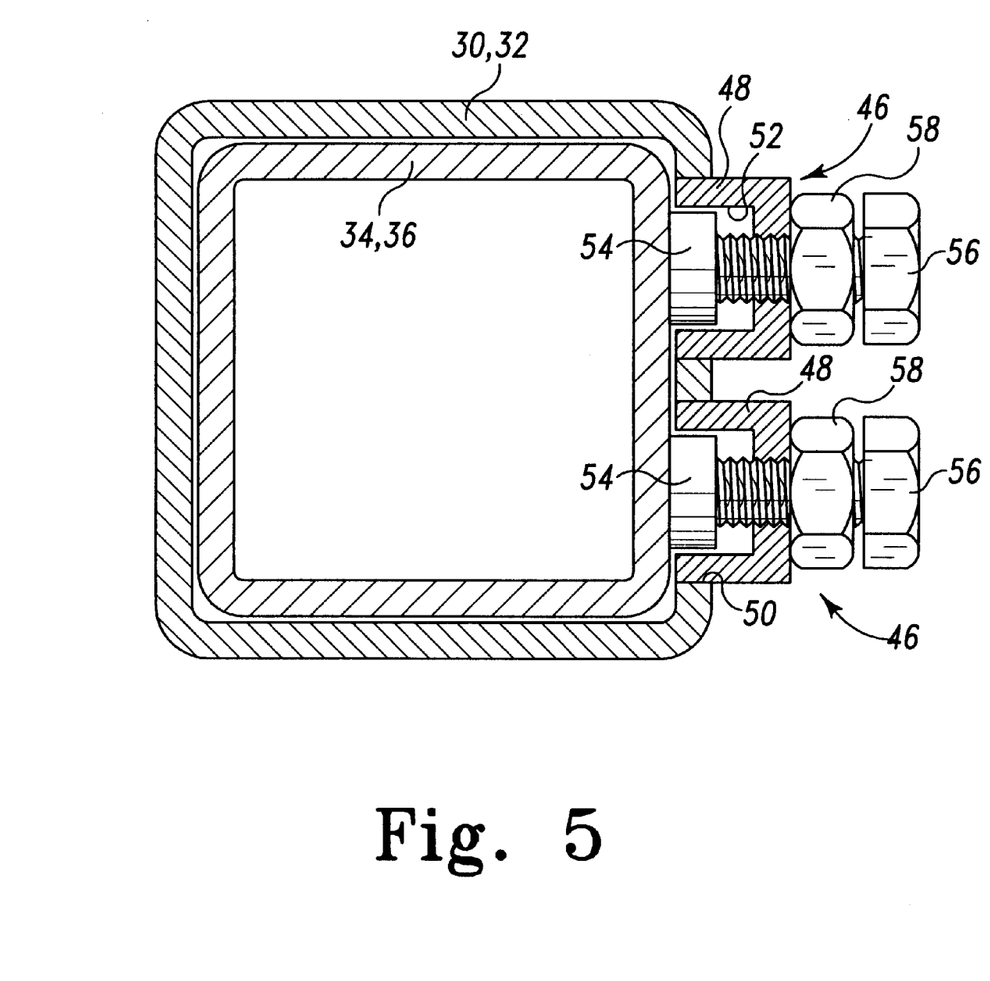
FIG. 5 is an enlarged cross sectional view taken along the line 5—5 of FIG. 4, as viewed in the direction of the arrows, note that certain components are not shown in cross section for clarity of description.

In order to maintain the inner axle tubes 34, 36 in a desired position relative to the outer axle tubes 30, 32, respectively, the crop sprayer 10 includes a number of locking assemblies 46. The locking assemblies 46 are provided to selectively lock or otherwise prevent movement of the inner axle tubes 34, 36 relative to the outer axle tubes 30, 32, respectively. As shown in FIG. 5, each of the locking assemblies 46 includes a cylindrically shaped housing 48 which is welded or otherwise secured within a recess such as an aperture 50 defined in a sidewall of the outer axle tubes 30, 32. The housing 48 has a central cavity 52 defined therein in order to house a contact member or disk 54. The disk 54 is positionable between an extended position and a retracted position. When positioned in its extended position, a first face or side of the disk 54 is urged into contact with a sidewall of the inner axle tubes 34, 36 thereby preventing the inner axle tubes 34, 36 from being moved relative to the outer axle tubes 30, 32. Conversely, when positioned in its retracted position, a second face or side of the disk 54 is partially or completely received into the central cavity 52 thereby allowing the inner axle tubes 34, 36 to be slid freely or otherwise moved relative to the outer axle tubes 30, 32, respectively.

In order to move the disk 54 between its extended and retracted positions, each of the locking assemblies 46 includes a biasing member such as a bolt 56. The housing 48 has an internally threaded nut 58 welded thereto, as shown in FIG. 5. The threaded shaft of the bolt 56 is threadingly received through the threaded aperture of the nut 58 thereby positioning an end of the threaded shaft of the bolt 56 in contact with the disk 54. As the bolt 56 is tightened, the end of the bolt 56 within the central cavity 52 of the housing 48 urges the disk 54 into contact with the sidewall of one of the inner tubes 34 or 36. Conversely, when the bolt 56 is loosened, the end of the bolt 56 within the central cavity 52 is retracted thereby allowing the disk 54 to assume its retracted position in which it is partially or completely received into the central cavity 52.

Hence, in order to lock one of the inner axle tubes 34, 36 in a fixed position relative to an outer axle tube 30, 32, respectively, the bolts 56 associated with each of the locking assemblies 48 is tightened to a predetermined torque value thereby causing the disk 54 to be urged into contact with the sidewall of the inner axle tube 34, 36 with a predetermined amount of force which is sufficient to prevent movement of the inner axle tube 34, 36 relative to the outer axle tube 30, 32, respectively. Thereafter, if it is desirable to change the operational width of the crop sprayer 10 (or remove the inner axle tubes 34, 36 for the purpose of "flipping" the axles in order to change the operational height of the crop sprayer 10), the bolts 56 are loosened in order to allow the disk 54 to assume its retracted position in which it is received into the central cavity 52 of the housing 48 thereby allowing the inner axle tubes 34, 36 to slide or otherwise move relative to the outer axle tubes 30, 32. Once positioned in their desired locations, the inner axle tubes 34, 36 may then be locked in place by retightening the bolts 56 to the predetermined torque value.

Figure 6:
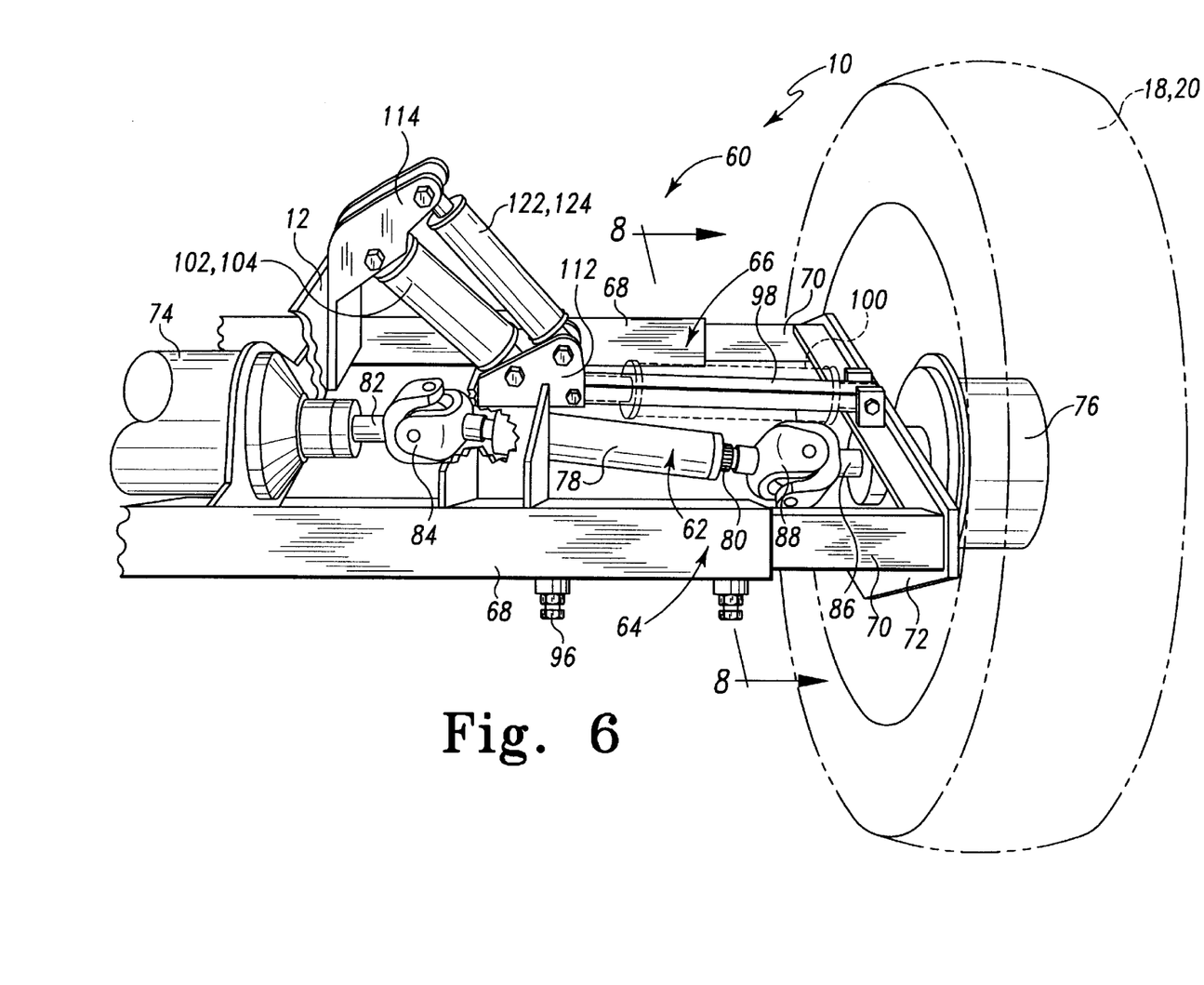
FIG. 6 is an enlarged fragmentary perspective view of a telescoping mechanical drive system which may be alternatively incorporated into the crop sprayer of FIG. 1, note that the drive system is shown in its retracted position.
Figure 7:
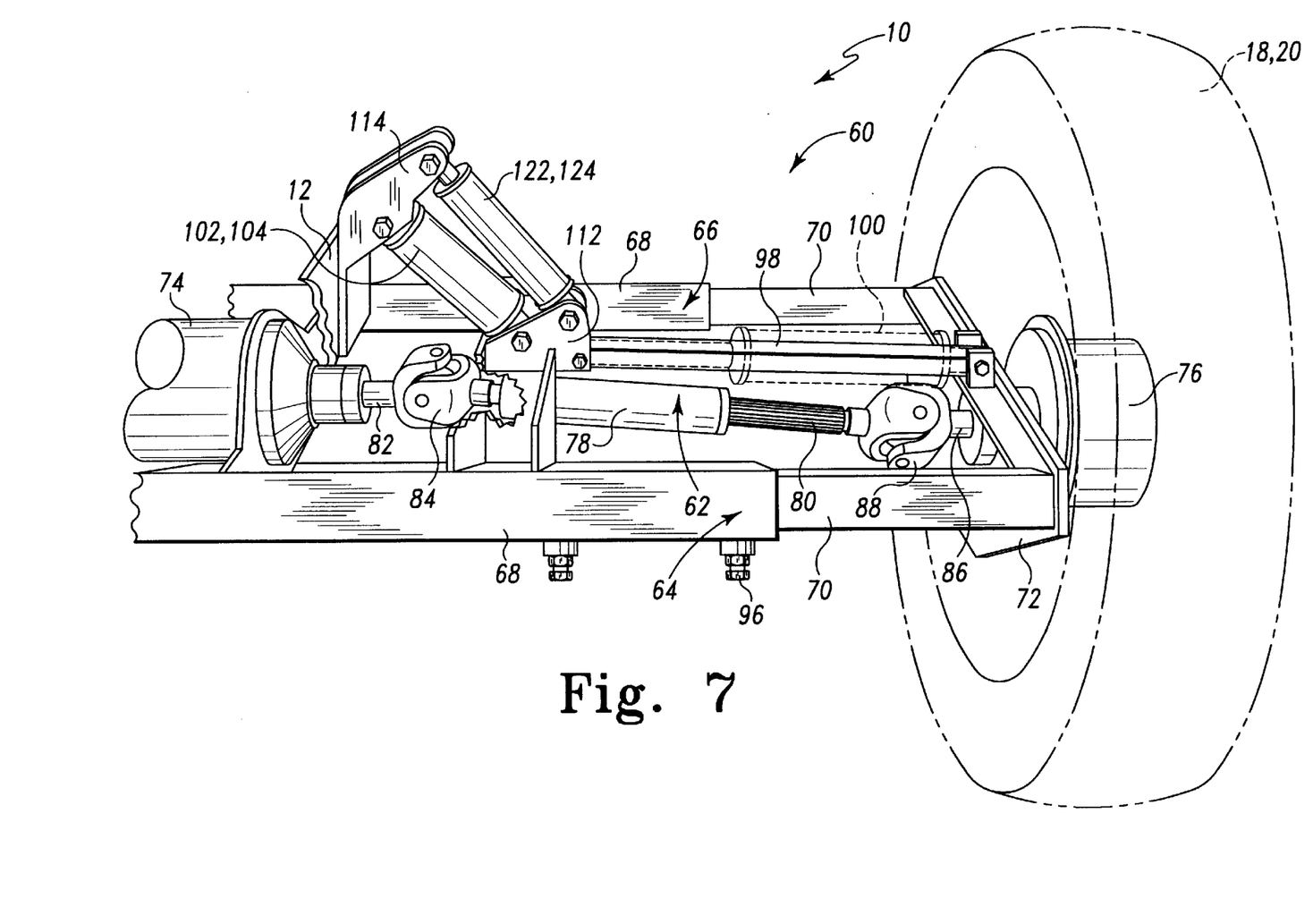
FIG. 7 is a view similar to FIG. 6, but showing the drive system positioned in its extended drive system.
Figure 8:
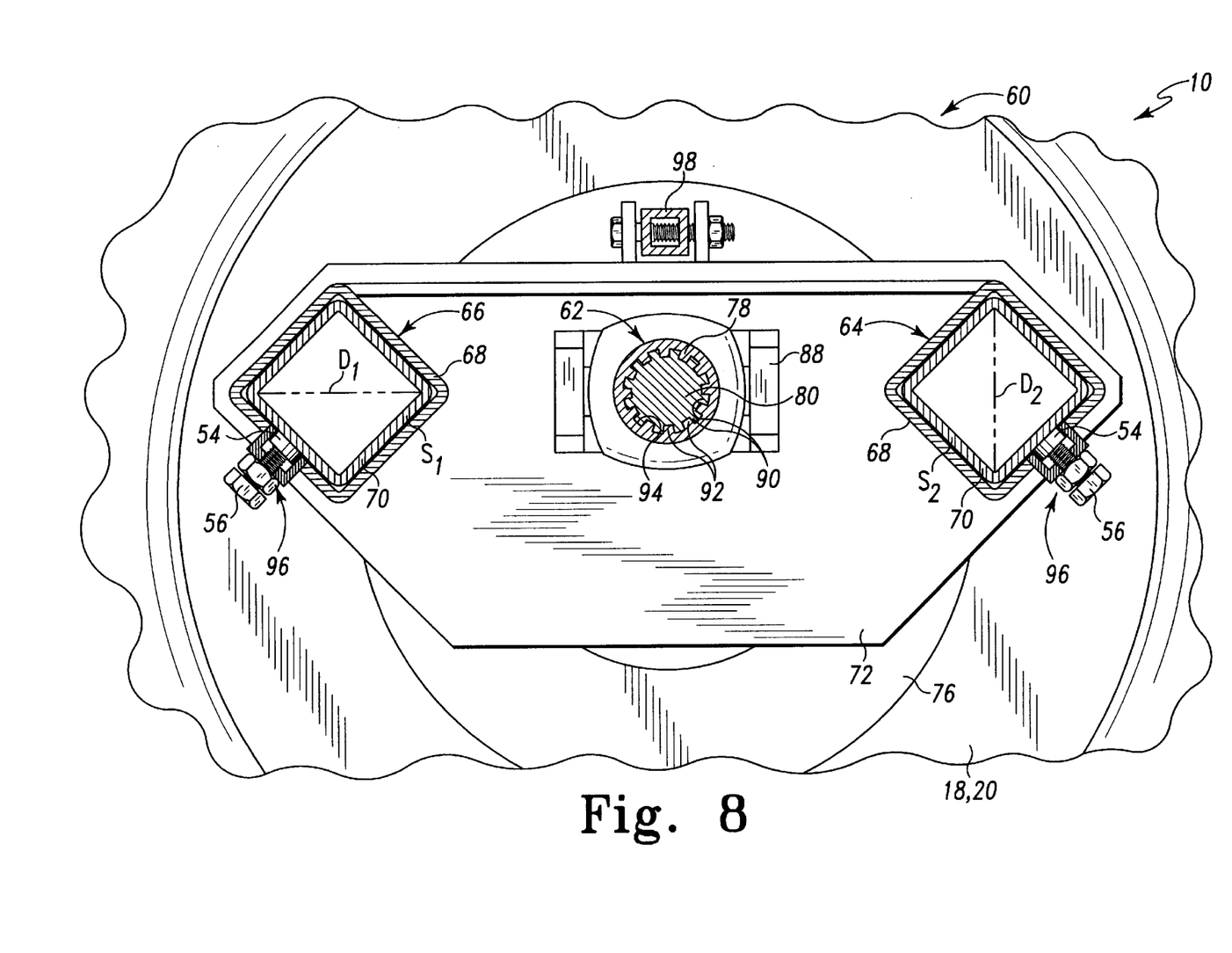
FIG. 8 is an enlarged cross sectional view taken along the line 8—8 of FIG. 6, note that certain components are not shown in cross section for clarity of description.

As alluded to above, the crop sprayer 10 may alternatively be embodied to include a mechanical drive system as opposed to a hydrostatic drive system. As shown in FIGS. 6–8, the mechanical drive system includes an adjustable-width rear axle assembly 60 for allowing the operational width of the crop sprayer 10 to be altered. The rear axle assembly 60 includes a telescoping axle drive shaft assembly 62 and a pair of telescoping support assemblies 64, 66. As shown in FIGS. 6–8, the drive shaft assembly 62 is interposed between the support assemblies 64, 66. Such a configuration provides enhanced structural rigidity and support to the drive shaft assembly 62. In particular, such a configuration prevents damage to the drive shaft assembly 62 as a result of twisting or torquing forces which may be exerted on the rear axle assembly. Moreover, unlike designs which include only a single support arm, the configuration of the rear axle assembly 60 provides adequate support and force absorption properties over a relatively wide axle width.

Each of the support assemblies 64, 66 includes an outer support tube 68 and an inner tube support 70. A first end of the outer support tubes 68 is secured to the chassis 12, whereas a second end of the outer support tubes 68 has an opening defined therein into which a first end of the inner support tubes 70 is received. A second end of the inner support tubes 70 is secured to a hub support plate 72. As shown in FIG. 8, the support tubes 68, 70 are rectangular-shaped, namely square, in transverse cross section. What is meant herein by the term "transverse cross section" is a cross section taken at 90° relative to the longitudinal axis of the tube. Moreover, as further shown in FIG. 8, the support tubes 68, 70 are arranged in a substantially diamond-shaped configuration. In particular, the square-shaped transverse cross section of the support tubes 68, 70 defines a first diagonal line $D_1$ and a second diagonal line $D_2$. In such a diamond-shaped configuration, the first diagonal line $D_1$ is substantial parallel to the ground or other surface on which the crop sprayer 10 is positioned, whereas the second diagonal line $D_2$ is substantially perpendicular or vertical relative to the ground.

Such a diamond shape configuration provides numerous advantages to the design of the crop sprayer 10. For example, loads encountered by the support assemblies 64, 66 in the vertical direction are absorbed across a larger distance (i.e. the entire length of the diagonal line $D_2$), relative to the distance a similar vertical load would be absorbed by other mounting arrangements. For example, if the square-shaped support assemblies 64, 66 were secured to the chassis 12 such that a side $S_1$ thereof was perpendicular or otherwise vertical relative to the ground or other surface on which the crop sprayer 10 is positioned, such vertical loads would be absorbed along a smaller distance (i.e. the length of the side $S_1$) relative to the length of the diagonal line $D_2$. Similarly, loads encountered by the support assemblies 64, 66 in a substantially horizontal direction are absorbed across a larger distance (i.e. the entire length of the diagonal line $D_1$), relative to the distance a similar horizontal load would be absorbed by other arrangements. For example, referring again to the hypothetical case in which the square-shaped support assemblies 64, 66 were secured to the chassis 12 such that a side $S_1$ thereof was perpendicular or otherwise vertical relative to the ground or other surface on which the crop sprayer 10 is positioned, such horizontal loads would be absorbed along a smaller distance (i.e. the length of a side $S_2$) relative to the length of the diagonal line $D_1$.

The telescoping drive shaft assembly 62 is provided to drive the rear wheels 18, 20 so as to propel the crop sprayer 10. In particular, a first end of the drive shaft assembly 62 is secured to an output of a differential assembly 74, whereas a second end of the drive shaft assembly 62 is secured to a wheel hub 76 which rotatably coupled to the hub support plate 72. More specifically, the drive shaft assembly 62 includes a housing 78 and a drive shaft 80 which is received into the housing 78. An end of the housing 78 is secured to an output shaft 82 of the differential assembly 74 by a universal joint assembly 84, whereas an end of the drive shaft 80 is secured to an input shaft 86 of the wheel hub 76 by a universal joint assembly 88.

As shown in phantom lines in FIGS. 6 and 7, the rear wheels 18, 20 are secured to the wheel hubs 76. Hence, mechanical output from the differential assembly 74 is transferred to the rear wheels 18, 20 via a mechanical path which includes the output shaft 82, the universal joint assembly 84, the housing 78, the drive shaft 80, the universal joint 88, the input shaft 86, and the wheel hub 76. Moreover, as shown in FIG. 8, the drive shaft 80 has a number of splines 90 defined in the outer surface thereof which are meshingly engaged with a corresponding number of splines 92 defined in the housing 78 around the periphery of a housing aperture 94 through which the drive shaft 80 is received. In such a manner, the drive shaft 80 is permitted to be axially retracted and extended into and out of the housing 78, but is prevented from rotating relative to the housing 78.

The adjustable-width rear axle assembly 60 also includes a number of locking assemblies 96. The locking assemblies 96 are substantially the same as the locking assemblies 46 which were described above in regard to the front axle assemblies. Hence, components which are similar between the locking assemblies 46 and the locking assemblies 96 have the same reference numbers associated therewith and additional discussion thereof is not warranted. When the bolts 56 associated with the locking assemblies 96 are tightened to a predetermined torque value, the inner support tubes 70 are locked or otherwise prevented from moving relative to the outer support tubes 68. Conversely, when the bolts 56 associated with the locking assemblies 96 are loosened, the inner support tubes 70 may be slid or otherwise moved relative to the outer support tubes 68. Moreover, a locking bar 98 may also be secured at one end to the chassis 12 and at a second end to the hub support plate 72 in order to lock the adjustable-width rear axle assembly 60 into place at a desired position.

As shown in phantom in FIGS. 6 and 7, the adjustable-width rear axle assembly 60 may alternatively be configured to include a fluid cylinder 100 in lieu of the locking bar 98. The fluid cylinder 100 is under operator control via a conventional cylinder control system (not shown) which allows the operator positioned in the cab 14 to actuate the fluid cylinder 100 (i.e. extend and retract the cylinder 100). In particular, a rod end of the fluid cylinder 100 is secured to the chassis 12, whereas a head end of the fluid cylinder 100 is secured to the hub support plate 72. Hence, extension of the fluid cylinder 100 causes the hub support plate 72 and hence the rear wheels 18, 20 to be moved outwardly in a direction substantially away from the chassis 12 thereby increasing the operational width of the adjustable-width rear axle assembly 60. Conversely, retraction of the fluid cylinder 100 causes the hub support plate 72 and hence the rear wheels 18, 20 to be moved inwardly in a direction substantially toward the chassis 12 thereby decreasing the operational width of the adjustable-width rear axle assembly 60. It should be appreciated that such use of the fluid cylinder 100 allows the width of the adjustable-width rear axle assembly to be increased "on the fly" during advancement of the crop sprayer 10. Moreover, it should also be appreciated that the bolts 56 associated with the locking mechanisms 96 are tightened to a torque value which is less than the torque value utilized to lock the inner support tubes 70 thereby firmly holding the inner support tubes 70 relative to the outer support tubes 68, but also allowing the inner support tubes 70 to be moved relative to the outer support tubes 68 by the fluid cylinder 100.

Figure 9:
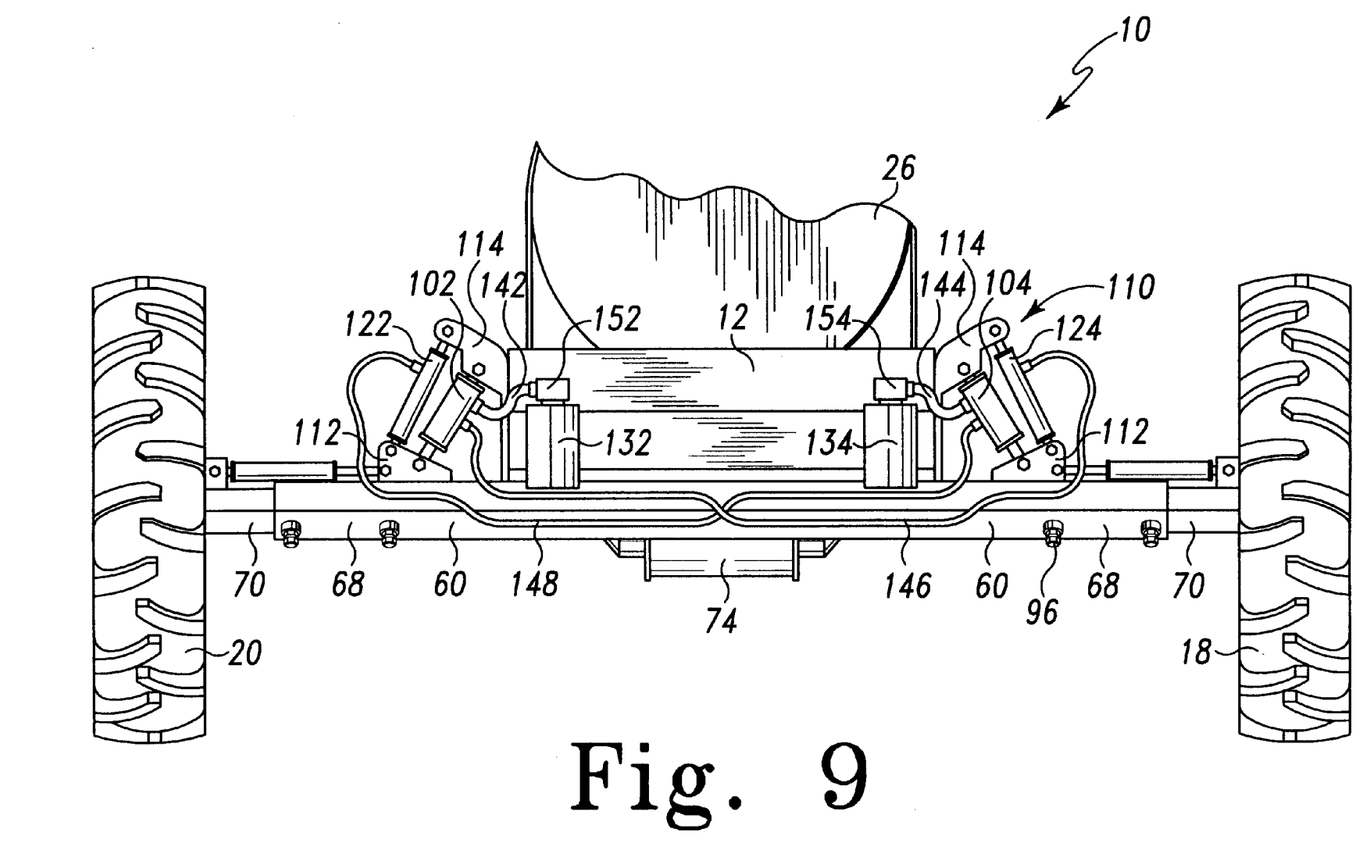
FIG. 9 is a rear elevational view of the crop sprayer of FIG. 1 which shows the hydraulic suspension system in greater detail, note that the boom assembly has been removed for clarity of description.
Figure 10:
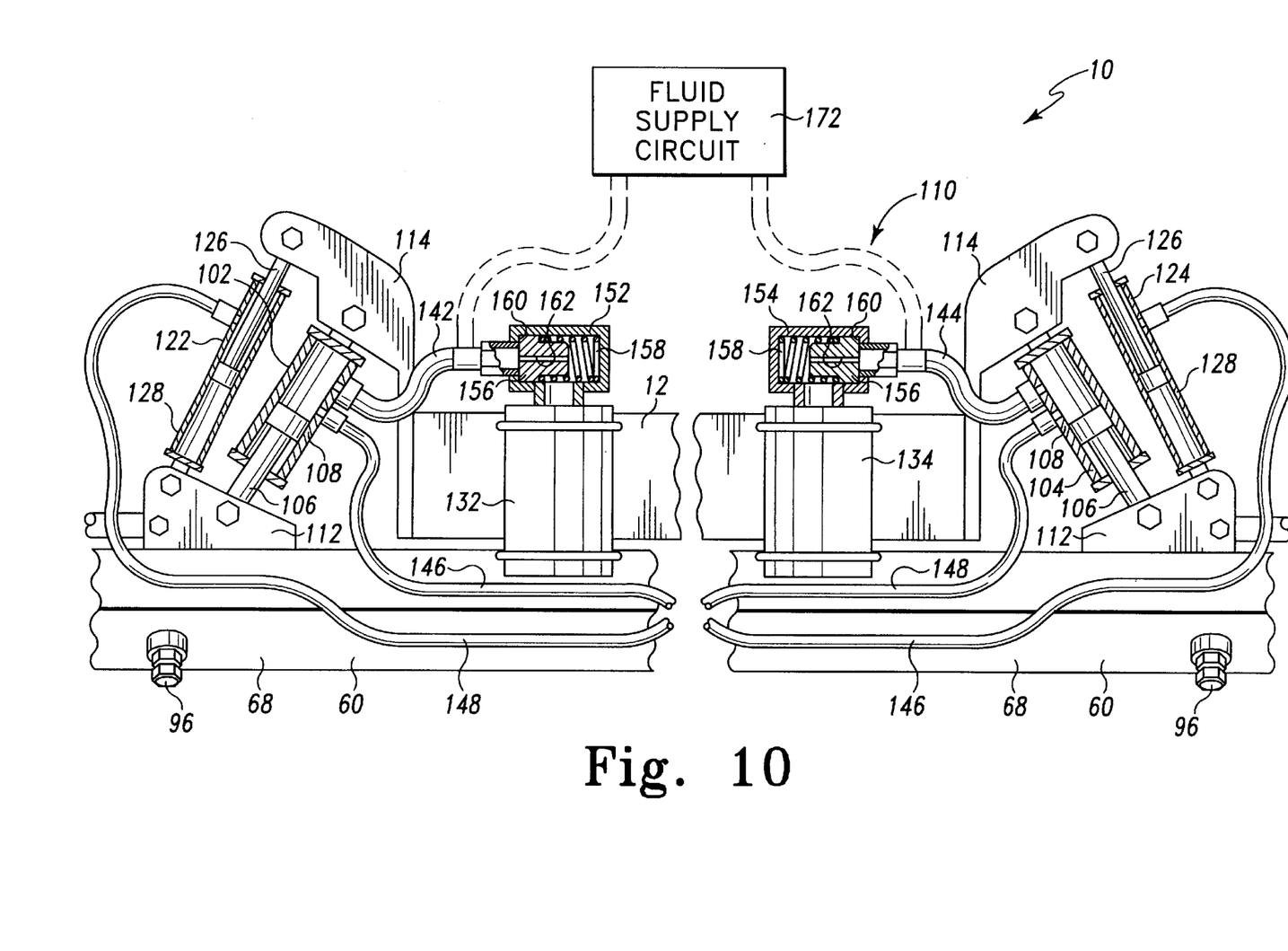
FIG. 10 is an enlarged, fragmentary partial cross sectional view of the hydraulic suspension system of FIG. 9.

Referring now to FIGS. 9 and 10, there is shown a hydraulic suspension system 110 which may be utilized in conjunction with the crop sprayer 10. The hydraulic suspension system 110 includes a pair of damping cylinders 102, 104 each of which has a first end that is secured to the rear axle assembly 60 and second end which is secured to the chassis 12. In particular, a rod 106 rod associated with each of the damping cylinders 102, 104 is secured to a mounting flange 112 associated with the rear axle assembly 60, whereas a housing 108 associated with each of the damping cylinders 102, 104 is secured to a mounting flange 114 associated with the in chassis 12.

The hydraulic suspension system 110 also includes a pair of leveling cylinders 122, 124 each of which has a first end that is secured to the rear axle assembly 60 and second end that is secured to the chassis 12. In particular, a rod 126 rod associated with each of the leveling cylinders 122, 124 is secured to the mounting flange 114 associated with the chassis 112, whereas a housing 128 associated with each of the leveling cylinders 122, 124 is secured to a mounting flange 112 associated with the rear axle assembly 60.

The hydraulic suspension system 110 also includes a pair of fluid accumulators 132, 134. The accumulators 132, 134 may be any type of know fluid accumulator such as a nitrogen-charged fluid accumulator. The fluid accumulators 132, 134 are fluidly coupled to the head ends of the damping cylinders 102, 104 via a pair of fluid lines 142, 144, respectively. The head end of the damping cylinder 102 is also fluidly coupled to the rod end of the leveling cylinder 124 via a fluid line 146, whereas the head end of the damping cylinder 104 is further fluidly coupled to the rod end of the leveling cylinder 122 via a fluid line 148.

The fluid lines 146, 148 are restricted relative to the fluid lines 142, 144. What is meant herein by the term "restricted" is that a first fluid line is not capable of passing the same amount of fluid under similar conditions as a second fluid line. For example, a fluid line having a relatively small diameter is restricted relative to a fluid line having a relatively large diameter. Similarly, a fluid line having a flow restrictor device positioned therein is restricted relative to an identical fluid line which does not have such a device positioned therein. In a preferred embodiment, the fluid lines 142, 144 have a larger diameter than the fluid lines 146, 148 thereby causing the fluid lines 146, 148 to be restricted relative to the fluid lines 142, 144. As shall be discussed below in greater detail, use of fluid lines of varying diameters provides numerous advantages to the suspension system 110 of the present invention.

A pair of check valves 152, 154 are fluidly interposed between the head ends of the damping cylinders 102, 104 and the fluid accumulators 132, 134, respectively. The check valves 152, 154 are configured to prevent the flow of hydraulic fluid into the accumulators 132, 134 until fluid pressure within the fluid lines 142, 144 exceeds a predetermined magnitude at which time the check valves 152, 154 assume an open check position thereby allowing fluid to enter the fluid accumulators 132, 134. The check valves 152, 154 are also configured to allow fluid within the fluid accumulators 132, 134 to slowly return to the fluid lines 142, 144. In particular, the valve member 156 associated with the check valves 152, 154 (see FIG. 10) is biased into its closed position in which it prevents fluid flow into the accumulators 132, 134 by a spring 158. However, when fluid pressure within the fluid lines 142, 144 exceeds a predetermined magnitude that overcomes the bias of the spring 158, the valve member 156 is urged off of its valve seat 160 thereby positioning it in its open check position so as to allow fluid to enter the fluid accumulators 132, 134.

As shown in FIG. 10, the valve member 156 has a bleed orifice 162 defined therein. Once fluid pressure within the fluid lines 142, 144 drops below the predetermined magnitude (i.e. the spring bias of the spring 158), the valve member 156 is urged back into contact with its valve seat 160 by the spring 158 thereby preventing additional fluid from entering the fluid accumulator 152, 154. Once the valve member 156 is urged back into contact with its valve seat 160, pressurized fluid within the fluid accumulator 152, 154 is bled back into the fluid lines 142, 144 through the bleed orifice 162.

As further shown in FIG. 10, the hydraulic suspension system 110 also includes a fluid supply circuit 172. The fluid supply circuit 172 includes a number of fluid components such as pumps, valves, and sensors which are utilized to maintain a predetermined level of hydraulic fluid in the hydraulic suspension system 110. Preferably, the fluid supply circuit 172 utilizes fluid components which perform other functions such as braking and hydraulic steering thereby eliminating the need to equip the crop sprayer 10 with redundant fluid components which are utilized solely for the purpose of supplying the hydraulic suspension system 110.

Moreover, each side of the hydraulic suspension system 110 is controlled independently of the other thereby providing independent control of each side of the rear axle assembly 60. In particular, as shown in FIGS. 9 and 10, the damping cylinder 102, the leveling cylinder 124, the check valve 152, and the accumulator 132 define a first fluid sub-circuit which is at all times fluidly isolated from a second fluid sub-circuit which includes the damping cylinder 104, the leveling cylinder 122, the check valve 154, and the accumulator 134. The fluid supply circuit 172 is preferably configured to independently monitor and control fluid levels of each fluid sub-circuit in order to provide independent control of each side of the suspension system 110 and hence each side of the rear axle assembly 60.

The above-described configuration of the suspension system 110 provides for leveling control of the crop sprayer 10 during cornering thereof along with when the crop sprayer 10 is being operated on inclines or the like while also providing for damping in the event that the crop sprayer 10 encounters sudden changes in surface topography. In particular, in the event of a turn or other event which causes the crop sprayer 10 to lean, fluid communication between the damping cylinder 102 and the leveling cylinder 124 along with fluid communication between the damping cylinder 104 and the leveling cylinder 122 allows the chassis 12 of the crop sprayer 10 to be maintained in a relatively level orientation.

Such operation will now be exemplary described in the context of a right-hand turn being executed by the crop sprayer 10. In particular, as the crop sprayer 10 turns to the right, eccentric forces encountered during the turn will urge the right side of the chassis 12 upwardly while simultaneously urging the left side of the chassis 12 downwardly. Such downward urging of the left side of the chassis 12 causes the rod 106 associated with the damping cylinder 102 to be urged into its housing 108 thereby forcing hydraulic fluid within the head end of the damping cylinder 102 out of the housing 108 and into the fluid lines 142 and 146. Initially, due to its relatively large diameter, a relatively large portion of the fluid being expelled from the head end of the damping cylinder 102 is advanced through the fluid line 142 thereby causing fluid pressure within the fluid line 142 to open the check valve 152 thereby forcing fluid into the accumulator 132. Once the accumulator 132 fills (or pressure therein exceeds fluid pressure in the fluid line 142), fluid pressure in the fluid line 146 begins to increase thereby increasing fluid pressure in the rod end of the leveling cylinder 124.

Such an increase in fluid pressure in the rod end of the leveling cylinder 124 causes the rod 126 associated with the leveling cylinder 124 to be retracted into its housing 128. Retraction of the rod 126 causes the right side of the chassis 12 to be pulled or otherwise urged downwardly so as to level the right side of the chassis 12 with the left side of the chassis 12. As the crop sprayer 10 exits the right-hand turn, the eccentric forces acting on the crop sprayer 10 diminish thereby causing the left side of the chassis 12 to be urged upwardly thereby causing the rod 106 associated with the damping cylinder 102 to be further extended out of its housing 108. Such extension of the rod 106 increases the volume within the head end of the damping cylinder 102 thereby causing fluid from the fluid lines 142 and 146 to flow into the head end of the damping cylinder 102. This causes fluid to be removed from the rod end of the leveling cylinder 124 thereby retracting the rod 126 associated therewith into its housing 128. Such retraction of the rod 126 pulls or otherwise urges the right side of the chassis 12 downwardly thereby leveling the right side of the chassis 12 with the left side of the chassis 12.

Similarly, if the crop sprayer 10 turns to the left, eccentric forces encountered during the turn will urge the left side of the chassis 12 upwardly while simultaneously urging the right side of the chassis 12 downwardly. Such downward urging of the right side of the chassis 12 causes the rod 106 associated with the damping cylinder 104 to be urged into its housing 108 thereby forcing hydraulic fluid within the head end of the damping cylinder 104 out of the housing 108 and into the fluid lines 144 and 148. Initially, due to its relatively large diameter, a relatively large portion of the fluid being expelled from the head end of the damping cylinder 104 is advanced through the fluid line 144 thereby causing fluid pressure within the fluid line 144 to open the check valve 154 thereby forcing fluid into the accumulator 134. Once the accumulator 134 fills (or pressure therein exceeds fluid pressure in the fluid line 144), fluid pressure in the fluid line 148 begins to increase thereby increasing fluid pressure in the rod end of the leveling cylinder 122.

Such an increase in fluid pressure in the rod end of the leveling cylinder 122 causes the rod 126 associated with the leveling cylinder 122 to be retracted into its housing 128. Retraction of the rod 126 causes the left side of the chassis 12 to be pulled or otherwise urged downwardly so as to level the left side of the chassis 12 with the right side of the chassis 12. As the crop sprayer 10 exits the left-hand turn, the eccentric forces acting on the crop sprayer 10 diminish thereby causing the right side of the chassis 12 to be urged upwardly thereby causing the rod 106 associated with the damping cylinder 104 to be further extended out of its housing 108. Such extension of the rod 106 increases the volume within the head end of the damping cylinder 104 thereby causing fluid from the fluid lines 144 and 148 to flow into the head end of the damping cylinder 104. This causes fluid to be removed from the rod end of the leveling cylinder 122 thereby retracting the rod 126 associated therewith into its housing 128. Such retraction of the rod 126 pulls or otherwise urges the left side of the chassis 12 downwardly thereby leveling the left side of the chassis 12 with the right side of the chassis 12.

Somewhat different from the case of when the crop sprayer 10 is executing a turn in which eccentric forces are gradually applied to the chassis 12 (and hence the hydraulic suspension system 110) is the case of when the crop sprayer 10 encounters irregular surface topography while, for example, tracking straight forward. In such a case, forces are suddenly exerted on the chassis 12 (and hence the hydraulic suspension system 110) and then quickly disappear. In such a situation, it is desirable to allow the damping cylinders 102, 104 to absorb such forces without causing significant actuation of the leveling cylinders 122, 124. This is true since in the case of where the crop sprayer 10 is advancing in a straight direction and encounters, for example, a rock or a washout in the field, the substantially vertical resultant forces exerted on the chassis 12 may not cause the chassis 12 to lean thereby eliminating the need to level the chassis 12. However, it is desirable to dampen such forces in order to provide a relatively smooth ride.

The use of fluid lines of varying restriction (e.g. varying diameter) facilitates such damping of the encountered forces. Such operation will now be exemplary described in the context of when the left rear wheel 20 encounters irregular surface topography such as a rock or other type of "bump". In particular, as the left rear wheel 20 of the crop sprayer 10 encounters the rock, substantially vertical resultant forces will urge the left side of the chassis 12 upwardly. Such upward urging of the left side of the chassis 12 causes the rod 106 associated with the damping cylinder 102 to be urged into its housing 108 thereby forcing hydraulic fluid within the head end of the damping cylinder 102 out of the housing 108 and into the fluid lines 142 and 146. Due to its relatively large diameter, a relatively large portion of the fluid being expelled from the head end of the damping cylinder 102 is quickly advanced through the fluid line 142 thereby causing fluid pressure within the fluid line 142 to quickly open the check valve 152 thereby forcing fluid into the accumulator 132. Once the crop sprayer 10 has passed over the rock, force on the rod 106 is quickly removed thereby causing fluid pressure in the fluid line 142 to quickly fall thereby causing the check valve 152 to close. Thereafter, fluid within the accumulator 132 is controllably bled back into the head end of the damping cylinder 102 via the bleed orifice 162 thereby causing the rod 106 associated with the damping cylinder 102 to be urged back to its original position.

It should be appreciated from the above description that by use of a fluid line (i.e. the fluid line 142) with a relatively large diameter (as compared to the fluid line 146) fluid forced out of the damping cylinder 102 is advanced into the accumulator 132 quickly enough to prevent fluid pressure within the fluid line 146 from increasing to the necessary level to actuate the leveling cylinder 124. Hence, the vertical forces exerted on the chassis 12 by contact with the rock or other debris may be absorbed without actuating the leveling cylinder 124. It should also be appreciated that forces encountered by the right side of the chassis 12 are absorbed by the damping cylinder 104 in a similar manner without actuation of the leveling cylinder 122.

Hence, as described herein, the crop sprayer 10 of the present invention has numerous advantages over heretofore designed crop sprayers. For example, the novel axle assemblies described herein allow the operational height of the crop sprayer 10 to be quickly and easily altered without the need for expensive components such as fluid cylinders or other types of actuators. Moreover, use of the locking assemblies (i.e. the locking assemblies 46, 96) of the present invention provide a quick, easy, and inexpensive manner by which the position of the inner axle tubes or inner support tubes may be locked or otherwise secured relative to the outer axle tubes or outer support tubes, respectively. In addition, the telescoping, adjustable-width rear axle assembly 60 provides an efficient, highly rigid axle arrangement which allows the operational width of a mechanical drive mechanism to be quickly and easily altered. Further, the hydraulic suspension system 110 of the present invention provides a mechanism which efficiently maintains proper leveling and damping of the crop sprayer 10 when it is subjected to long, gradual eccentric forces (e.g. those forces encountered during a turn) along with those forces which quickly appear and then quickly disappear (e.g. those forces encountered when one of the wheels of the crop sprayer 10 strikes a rock or the like).

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

There are a plurality of advantages of the present invention arising from the various features of the crop sprayer described herein. It will be noted that alternative embodiments of the crop sprayer of the present invention may not include all of the features described yet still benefit from at least some of the advantages of such features. Those of ordinary skill in the art may readily devise their own implementations of a crop sprayer or other type of work machine that incorporate one or more of the features of the present invention and fall within the spirit and scope of the present invention as defined by the appended claims.

What is claimed is:

1. An adjustable-width axle assembly of a work machine, comprising:

a first telescoping support assembly;

a second telescoping support assembly; and a telescoping drive shaft assembly, wherein said telescoping drive shaft assembly is interposed between said first telescoping support assembly and said second telescoping support assembly.

2. The axle assembly of claim 1, wherein:

said first telescoping support assembly includes a first outer tube and a first inner tube which is positioned within said first outer tube, said first inner tube being movable relative to said first outer tube, and said second telescoping support assembly includes a second outer tube and a second inner tube which is positioned within said second outer tube, said second inner tube being movable relative to said second outer tube.

3. The axle assembly of claim 2, further comprising a chassis and a hub support plate, wherein:
said first outer tube has a first end and a second end,
said first inner tube has a first end and a second end,
said second outer tube has a first end and a second end,
said second inner tube has a first end and a second end,
said first end of said first outer tube is secured to said chassis,
said first end of said first inner tube is received into said second end of said first outer tube,
said second end of said first inner tube is secured to said hub support plate,
said first end of said second outer tube is secured to said chassis,
said first end of said second inner tube is received into said second end of said second outer tube, and
said second end of said second inner tube is secured to said hub support plate.

4. The axle assembly of claim 3, further comprising a differential assembly and a wheel hub, wherein:
said differential assembly is secured to said chassis,
said wheel hub is rotatably secured to said hub support plate,
said telescoping drive shaft assembly has a first end and a second end,
said first end of said telescoping drive shaft assembly is secured to an output of said differential assembly, and
a second end of said drive shaft is secured to said wheel hub.

5. The axle assembly of claim 4, wherein:
said telescoping drive shaft assembly includes a housing and a shaft,
a first end of said housing is secured to said output of said differential assembly,
a second end of said housing has a housing aperture defined therein,
a first end of said shaft is received into said housing aperture, and
a second end of said shaft is secured to said wheel hub.

6. The axle assembly of claim 5, wherein:
said shaft has a first number of splines defined therein,
said housing has a second number of splines defined therein, said second number of splines being disposed around a periphery of said housing aperture, and
said first number of splines is meshingly engaged with said second number of splines so as to prevent rotation of said housing relative to said shaft.

7. The axle assembly of claim 3, further comprising a fluid cylinder, wherein:
a first end of said fluid cylinder is secured to said chassis,
a second end of said fluid cylinder is secured to said hub support plate, and
actuation of said fluid cylinder causes said hub support plate to be moved relative to said chassis.

8. The axle assembly of claim 2, wherein a transverse cross section of each of said first outer tube, said first inner tube, said second outer tube, and said second inner tube is substantially rectangular in shape.

9. The axle assembly of claim 2, further comprising a wheel secured to said telescoping drive shaft assembly for supporting said work machine on a substantially horizontal surface, wherein:
a transverse cross section of each of said first outer tube, said first inner tube, said second outer tube, and said second inner tube defines a rectangle,
said rectangle has a first diagonal line and a second diagonal line,
said first diagonal line is substantially parallel to said horizontal surface, and
said second diagonal line is substantially perpendicular to said horizontal surface.

10. The axle assembly of claim 2, wherein a transverse cross section of each of said first outer tube, said first inner tube, said second outer tube, and said second inner tube is substantially diamond shaped.

11. A method of adjusting width of an axle assembly of a work machine, with said axle assembly including (i) a first telescoping support assembly, (ii) a second telescoping support assembly, and (iii) a telescoping drive shaft assembly, comprising the steps of:
extending each of said first telescoping support assembly, said second telescoping support assembly, and said telescoping drive shaft assembly so as to position said axle assembly in a first position during a first period of time, wherein said telescoping drive shaft assembly is interposed between said first telescoping support assembly and said second telescoping support assembly during said extending step;
operating said work machine so as to perform a first work function during said first period of time; and
retracting each of said first telescoping support assembly, said second telescoping support assembly, and said telescoping drive shaft assembly so as to position said axle assembly in a second position during a second period of time, wherein said telescoping drive shaft assembly is interposed between said first telescoping support assembly and said second telescoping support assembly during said retracting step.

12. The method of claim 11, wherein:
said first telescoping support assembly includes a first outer tube and a first inner tube which is positioned within said first outer tube, said first inner tube being movable relative to said first outer tube,
said second telescoping support assembly includes a second outer tube and a second inner tube which is positioned within said second outer tube, said second inner tube being movable relative to said second outer tube,
said extending step includes the steps of (i) moving said first inner tube relative to said first outer tube such that said first inner tube extends out of said first outer tube by a first distance, and (ii) moving said second inner tube relative to said second outer tube such that said second inner tube extends out of said second outer tube by said first distance,
said retracting step includes the steps of (i) moving said first inner tube relative to said first outer tube such that said first inner tube extends out of said first outer tube by a second distance, and (ii) moving said second inner tube relative to said second outer tube such that said second inner tube extends out of said second outer tube by said second distance, and
said first distance is greater than said second distance.

13. The method of claim 11, wherein:
said work machine further includes a chassis and a hub support plate,
a first end of both said first telescoping support assembly and said second telescoping support assembly is secured to said chassis, a second end of both said first telescoping support assembly and said second telescoping support assembly is secured to said hub support plate, said extending step includes the step of moving said hub support plate in a direction substantially away from said chassis, and said retracting step includes the step of moving said hub support plate in a direction substantially toward said chassis.

14. The method of claim 13, wherein:

said work machine further includes a differential assembly and a wheel hub, said differential assembly is secured to said chassis, said wheel hub is rotatably secured to said hub support plate, said telescoping drive shaft assembly has a first end and a second end, said first end of said telescoping drive shaft assembly is secured to an output of said differential assembly, a second end of said drive shaft is secured to said wheel hub, said extending step includes the step of extending said telescoping drive shaft assembly so as to increase a distance between said wheel hub and said differential assembly, and said retracting step includes the step of retracting said telescoping drive shaft assembly so as to decrease said distance between said wheel hub and said differential assembly.

15. The method of claim 14, wherein:

said telescoping drive shaft assembly includes a housing and a shaft a first end of said housing is secured to said output of said differential assembly, a second end of said housing has a housing aperture defined therein, a first end of said shaft is received into said housing aperture, a second end of said shaft is secured to said wheel hub, said shaft is moved relative to said housing during both said extending step and said retracting step.

16. The method of claim 13, wherein:

said work machine further includes a fluid cylinder, a first end of said fluid cylinder is secured to said chassis, a second end of said fluid cylinder is secured to said hub support plate, said extending step includes the step of extending said fluid cylinder so as to cause said hub support plate to be moved relative to said chassis, and said extending step includes the step of retracting said fluid cylinder so as to cause said hub support plate to be moved relative to said chassis.

17. A crop sprayer, comprising:

a chassis;

a differential assembly secured to said chassis;

a hub assembly having a hub support plate with a wheel hub rotatably secured thereto;

a first telescoping support assembly having a first outer tube and a first inner tube which is positioned within said first outer tube, said first inner tube being movable relative to said first outer tube;

a second telescoping support assembly having a second outer tube and a second inner tube which is positioned within said second outer tube, said second inner tube being movable relative to said second outer tube; and a telescoping drive shaft assembly, wherein (i) both said first outer tube and said second outer tube are secured to said chassis, (ii) both said first inner tube and said second inner tube are secured to said hub support plate, (iii) a first end of said telescoping drive shaft assembly is secured to an output of said differential assembly, (iv) a second end of said telescoping drive shaft assembly is secured to said wheel hub, and (v) said telescoping drive shaft assembly is interposed between said first telescoping support assembly and said second telescoping support assembly.

18. The crop sprayer of claim 17, further comprising a fluid cylinder, wherein:

a first end of said fluid cylinder is secured to said chassis, a second end of said fluid cylinder is secured to said hub support plate, and actuation of said fluid cylinder causes said hub support plate to be moved relative to said chassis.

19. The crop sprayer of claim 17, wherein a transverse cross section of each of said first outer tube, said first inner tube, said second outer tube, and said second inner tube is substantially rectangular in shape.

20. The crop sprayer of claim 17, wherein a transverse cross section of each of said first outer tube, said first inner tube, said second outer tube, and said second inner tube is substantially diamond shaped.

* * * * *